Figure 1:
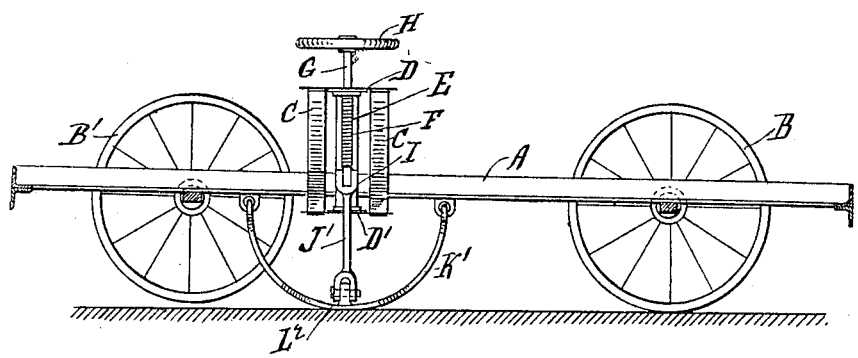

No. 818,815. PATENTED APR. 24, 1906.
R. BUGGÉ.
BRAKE FOR MOTOR CARS.
APPLICATION FILED MAR. 25, 1905.

2 SHEETS—SHEET 1.

No. 818,815. PATENTED APR. 24, 1906.
R. BUGGÉ.
BRAKE FOR MOTOR CARS.
APPLICATION FILED MAR. 25, 1905.

2 SHEETS—SHEET 2.

UNITED STATES PATENT OFFICE.

RASMUS BUGGÉ, OF LONDON, ENGLAND.

BRAKE FOR MOTOR-CARS.

No. 818,815.  Specification of Letters Patent.  Patented April 24, 1906.

Application filed March 25, 1905. Serial No. 251,988.

*To all whom it may concern:*

Be it known that I, RASMUS BUGGÉ, a subject of the King of Great Britain and Ireland, residing at 12 Annis road, Hackney, London, England, have invented certain new and useful Improvements in Brakes for Motor-Cars, Automobiles, and other Like Vehicles, of which the following is a specification.

The invention relates to improvements in brakes to be used for motor-cars, automobiles, and other like vehicles.

The object of the invention is to provide a brake that shall act independently of the wheels, and thus relieve them of the strain and wear to which they are subject under the present plan of applying the brakes to the rims or tires or similar arrangements.

In order to carry out this invention, I provide a strong iron bow fixed to each side of the frame of the vehicle and under the same, just clear of the ground. At the middle of this said bow is formed a plate or skid shaped somewhat to that of the bowl of a spoon. In the center of this plate is fixed an eyebolt, to which is attached an arm or bar of iron. The other or upper end of this bar is attached to a nut, of brass, steel, or other convenient metal, through which is threaded a screwed rod fixed in the middle of the car. When this screwed rod or spindle is turned, it causes the nut to travel downward and extends the two arms—viz., one to each side frame. This extension movement brings the bottom of the bow to come close to the ground and bear hard upon it, thus forming a friction-brake. The effect of this is that the car is forced up, so that the after or driving wheels are raised off the ground and the tires saved from injury, which now so often happens when the ordinary brakes are applied.
The position of these improved brakes on the under side of the car-frame is fixed so that the after or driving wheels are sure of being raised when the brake is applied.

The bow of the brake is fixed on strong eyebolts, that act as hinges. The "spoon-plates" aforesaid on the bow (having a much greater width than the space occupied by the tires of the wheels when they are applied) stop the car much more effectively and quickly than when the wheels themselves are acted upon by a brake, besides relieving the wheels of undue strain. When the center nut is raised by the screwed rod or spindle, the spoon-plates on the bows of the brake-frame are simultaneously withdrawn from the ground, the wheels take the ground, and the car or vehicle may proceed. The center screwed rod or spindle or corresponding levers and rods can be worked by hand, by spring, or any other means that may be most convenient.

In order to assure that the after or driving wheels are raised when the brake is applied, it is proposed to fix the brake at about there-fifths of the length of the car or vehicle from the front, or at a like distance, according to the build or weight of the vehicle.

By means of this improved brake an instantaneous and powerful means of stopping a car or vehicle is provided and the tires are saved from injury in that they are kept from being forced over rough ground by the impetus of the car, and also by locking the screwed spindle or rod in its place the car can be left by the occupant without any fear of the vehicle being maliciously or accidentally set in motion.

In order that this invention may be readily understood, reference is made to the accompanying drawings, in which—

Figure 2:
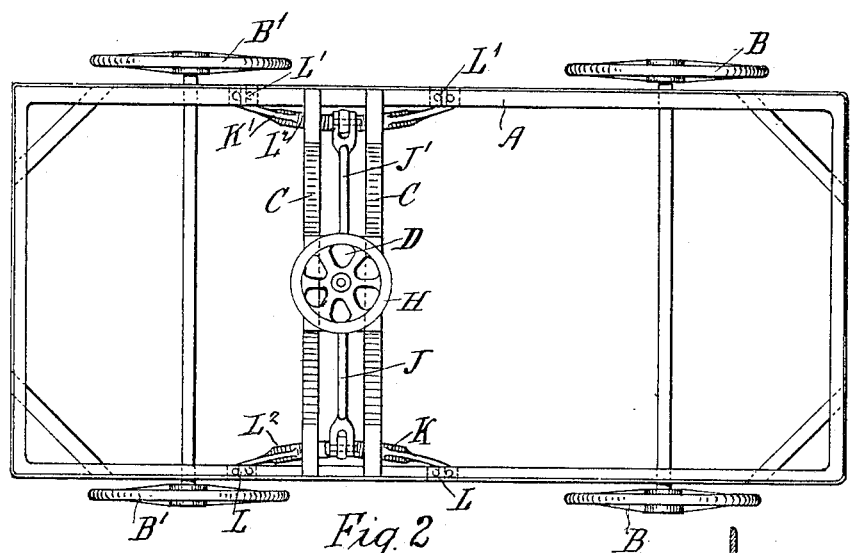
Figures 3, 4:
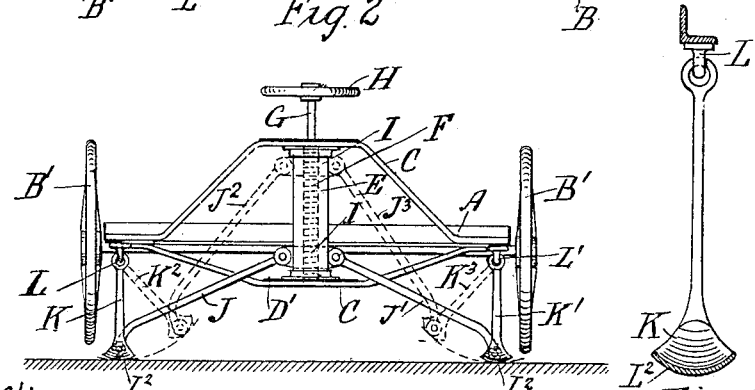
Figure 5:
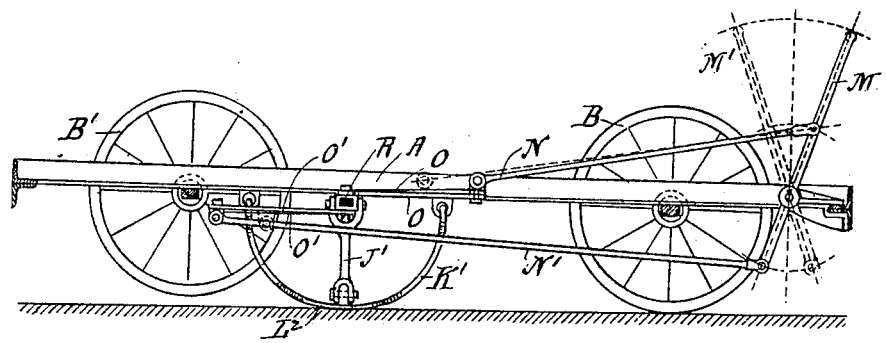
Figure 6:
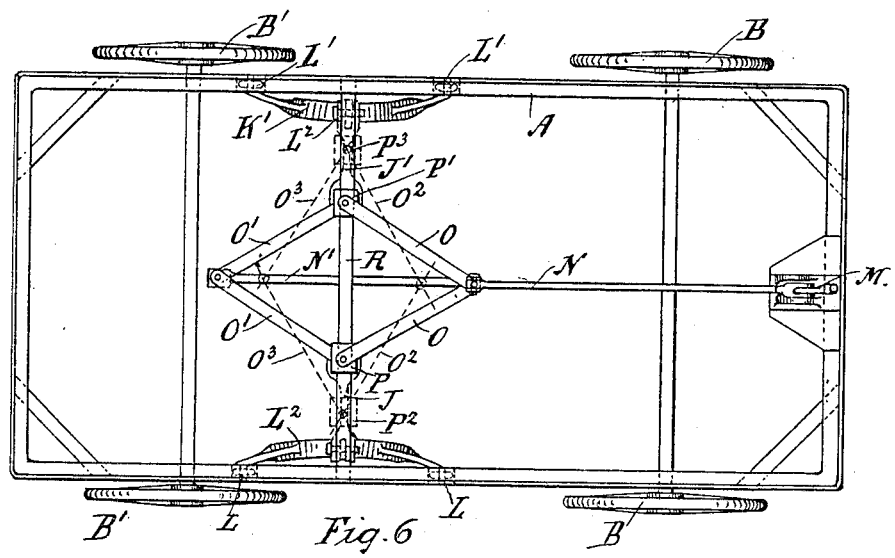
Figure 7:
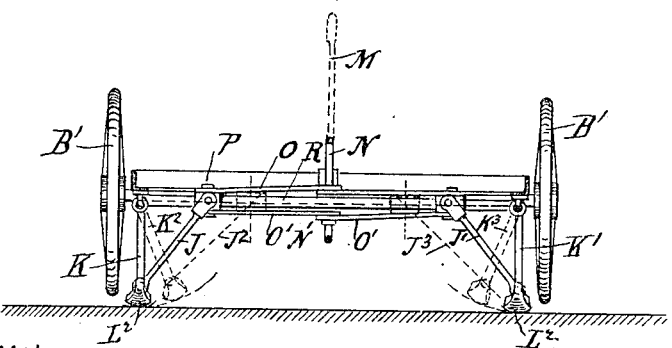

Figure 1 represents a sectional elevation of the apparatus; Fig. 2, a plan of the same; Fig. 3, a view in front elevation of a vehicle, showing the arrangement of the levers or arms for putting the brake-bows in or out of action; and Fig. 4 is an enlarged cross-section of the brake-bow. Figs. 5, 6, and 7 show, respectively, a sectional elevation plan and cross-section of an alternative arrangement for putting the brake-bows in or out of action by means of a hand-lever, and connecting-rods and sliding links.

In the several views, A is the frame of the vehicle. B B B' B' are the wheels of the said vehicle.

C C C C are strong iron frames attached to the motor car or vehicle in any convenient manner, with strong plates or frames D D' for carrying the frame E and screw F. This said screw F works inside the frame E and is actuated by the spindle G and handle H.

I is a nut of brass or other convenient metal which slides up or down the frame E, as actuated by the screw F and handle H.

J J' are arms or levers the upper ends of which are pivoted to the nut I, and the lower ends are likewise pivoted to the respective brake-bows K and K'. These said brake-bows are suspended from eyes L and L', fixed to the under side of the vehicle-frame A, and are so arranged that when in a vertical position they press on the ground and lift the wheels B' B', the shoe part L² acting as a skid or brake when put into action by the hand-wheel H. These said shoe parts, (hereinbefore mentioned as "spoon plates,") having a greater width than that of the wheel-tires, stop the car or vehicle more effectively and quickly than the wheels, besides relieving said wheels of undue strain. When these said brake-bows are put out of action by reversing the direction of motion of the hand-wheel H, the lever-arms J J' assume the position as shown by the dotted lines J² and J³, and the brake-bows are raised from the ground, as shown by dotted positions at K² and K³.

It should be noted that the hand-wheel H, the spindle G, and the screw-thread F are illustrated as showing one method of actuating the brakes K and K'; but the same action may be produced by any other means that may be convenient—as, for instance, in the arrangement shown in Figs. 5, 6, and 7. In this alternative arrangement the hand-wheel H is substituted by the hand-lever M, which actuates the connecting-rods N and N', the former being pushed back and the latter pulled forward simultaneously. These said connecting-rods are pivoted to sliding links O O and O' O', which are in turn pivoted to sliding sleeves P P'. These sleeves slide outwardly or inward on a cross-bar R, square or rectangular in section, and have pivoted to them the upper part of the arm or lever J and J', respectively. The effect of this arrangement of hand-lever, connecting-rods, and sliding links and sleeves is that by pulling over the hand-lever M to the position shown by dotted lines M' the sliding links O O O' O' are caused momentarily to dilate and push the sliding sleeves P and P' outwardly, as shown by dotted lines O² and O³ and P² P³, and the brake-bows K and K' are instantly put into action. To release the said brake-bows, it is only necessary to reverse the position of the hand-lever M to the position as shown by full lines on sectional elevation, Fig. 5, when the brake-bows K and K' are raised from the ground to the positions shown by dotted lines K² and K³ in cross-section, Fig. 7.

Having now described my invention, what I claim as new, and desire to secure by Letters Patent, is—

1. In motor-cars, automobiles and other like vehicles, a brake consisting of a laterally-swinging bow, the arms of which are pivotally connected to the vehicle, a plate on the lowest point of said bow adapted to contact with the ground, means whereby said bow may be swung laterally to force said plate into contact with the ground, and operating means located within the vehicle actuating said last-mentioned means whereby said plate may be set from within the vehicle.

2. In motor-cars, automobiles or other like vehicles, a brake consisting of a laterally-swinging bow, the arms of which are pivotally connected to the vehicle, arranged on the under part of each side of the vehicle, a plate on the lowest point of each said bow having a wide bowl-shaped surface adapted to contact with the ground, a screw mounted on said vehicle, means rotating said screw, a traveler-nut mounted on said screw, and links the opposite ends of which respectively are pivoted to said nut and to one of said bows, whereby said bows are swung laterally.

In witness whereof I have hereunto set my hand in presence of two witnesses.

R. BUGGÉ.

Witnesses:
H. D. JAMESON,
F. L. RAND.